United States Patent
Waterman et al.

(10) Patent No.: US 6,469,766 B2
(45) Date of Patent: Oct. 22, 2002

(54) RECONFIGURABLE MICRODISPLAY

(75) Inventors: John K. Waterman, Mesa; John D. Titus, Phoenix, both of AZ (US)

(73) Assignee: Three-Five Systems, Inc., Tempe, AZ (US)

( * ) Notice: Subject to any disclaimer, the term of this patent is extended or adjusted under 35 U.S.C. 154(b) by 0 days.

(21) Appl. No.: 09/740,187

(22) Filed: Dec. 18, 2000

(65) Prior Publication Data

US 2002/0113933 A1 Aug. 22, 2002

(51) Int. Cl.$^7$ ............................................. G02F 1/1343
(52) U.S. Cl. ...................................... 349/144; 349/145
(58) Field of Search .......................... 349/106; 348/384, 348/390, 571, 578, 580, 214, 716, 469, 470, 441, 458, 910, 173; 345/122; 382/232, 260, 293

(56) References Cited

U.S. PATENT DOCUMENTS 5,986,707 A * 11/1999 Geshwind ................... 348/384
6,037,926 A    3/2000 Hass et al. .................. 345/132

OTHER PUBLICATIONS

Press Release dated May 18, 1998.
Press Release dated Dec. 2, 1998.

* cited by examiner

*Primary Examiner*—Toan Ton
*Assistant Examiner*—Timothy L Rude
(74) *Attorney, Agent, or Firm*—John D. Titus

(57) ABSTRACT

The present invention comprises a flat panel display, such as a liquid crystal microdisplay having a plurality of square and rectangular pixel electrodes that are addressable separately to produce a fine resolution display or addressable in combination to create a lower resolution display. By providing an array of square pixel electrodes with adjacent rectangular electrodes, the display is capable of displaying, for example, XGA or SXGA video data, full-size undistorted and in its native display format, thus obviating the need for expensive image processing chips to convert the image data from one format to another.

10 Claims, 9 Drawing Sheets

RECONFIGURABLE MICRODISPLAY

BACKGROUND OF THE INVENTION

This invention relates to the field of graphics display devices, and in particular to display devices capable of displaying high resolution video information.

Continuing advances in the speed and computing capability of microprocessor-based video drivers coupled with consumer demands for ever-increasing video display resolution has lead to the availability of a wide variety of video display formats for computer displays. These displays range from conventional VGA (video graphics array) resolution of 640×480 picture elements ("pixels") to SVGA (800×600 pixels); XGA (1024×768 pixels); SXGA (1280×1024 pixels); all the way through to QXGA (2,048×1,536 pixels), which represents a ten-fold increase in the number of pixels over a conventional VGA display. Displays with even greater resolution such as QSXGA and greater are also available or proposed. Simultaneously, consumer demands for greater resolution in home entertainment systems has lead to the selection of a 1080×720 pixel display as the standard for high definition television (HDTV).

The existence of multiple video display formats for various applications has made it desirable for a single display device to be able to accommodate various display resolutions as well as various display aspect ratios. Conventional cathode ray tube (CRT) displays have an advantage over flat panel display (FPD) devices in that a high resolution CRT can accommodate lower resolution video signals and/or video signals of different aspect ratios simply by changing the scan rate of the CRT. The disadvantages of CRT displays are their size and high power consumption, among other things. The benefits of FPDs, especially LCD-based display devices such as direct-view LCD monitors, microdisplay projectors, and microdisplay monitors include reduced space, reduced power consumption, and reduced user eyestrain. Unfortunately, because flat panel displays comprise an array of individually addressable pixels, conversion of various video display formats for display on such devices has typically required a complete microprocessor based image processing system including a video processor scaler, frame rate converter, and image optimizing software as well as one or more frame buffers to convert the input display signal into a display signal that is compatible with the particular display device. Often, complex image smoothing software must be incorporated into the system so that if a low resolution image is displayed on a high resolution display the image looks smooth without jagged image areas. Similarly, if high resolution content is displayed on a lower resolution display, data interpolation must be performed to avoid unacceptable degradation of image quality. The computing power necessary to perform these image reformatting functions at video frame rates can be quite complex and add significant cost to the overall cost of such a display system.

One possible solution to the problem of displaying information in various display formats on a given LCD-based display would be to create a display having a resolution equal to the highest resolution video format to be displayed. Video information received in a lower resolution format could be displayed by displaying a single pixel of the low-resolution video information on more than one display pixel. Unfortunately, since the various current video display formats are not integer multiples of each other (or more precisely quadruple multiples of each other) displaying course resolution information on a fine resolution display would result in clipping of the image. Alternatively, displaying course resolution information directly on a fine resolution display would result in significantly decreased image size. Accordingly, what is needed is a microdisplay having plurality of pixels that are addressable separately or in combination to permit the display to be reconfigured on-the-fly to display video information in its native format with an image size appropriate to the particular display.

SUMMARY OF THE INVENTION

The present invention comprises a flat panel display, such as a liquid crystal microdisplay having a plurality of square and rectangular pixel electrodes that are addressable separately to produce a fine resolution display or addressable in combination to create a lower resolution display. In an illustrative embodiment of the present invention, the individual pixel electrodes are arranged in a repeating macropixel composed of four relatively larger square pixels, eight rectangular pixels, and four relatively smaller square pixels. In a high resolution mode, each of the larger square pixels, each pair of rectangular pixels and all four of the small square pixels are addressable in groups to create the required pixels for the fine resolution display. In the lower resolution mode, one larger square electrode in combination with two adjacent rectangular electrodes and one adjacent small square electrode are addressable as a group to create the pixels for the low resolution display. By providing sub-pixel electrodes in this precise configuration, the illustrative display is capable of displaying, for example, XGA or SXGA video data, full-size undistorted and in its native display format, thus obviating the need for expensive image processors to convert the video data from one format to another.

BRIEF DESCRIPTION OF THE DRAWING

The present invention will be better understood from a reading of the following detailed description, taken in conjunction with the accompanying drawing figures in which like references designate like elements, and in which.

DETAILED DESCRIPTION

Figure 1:
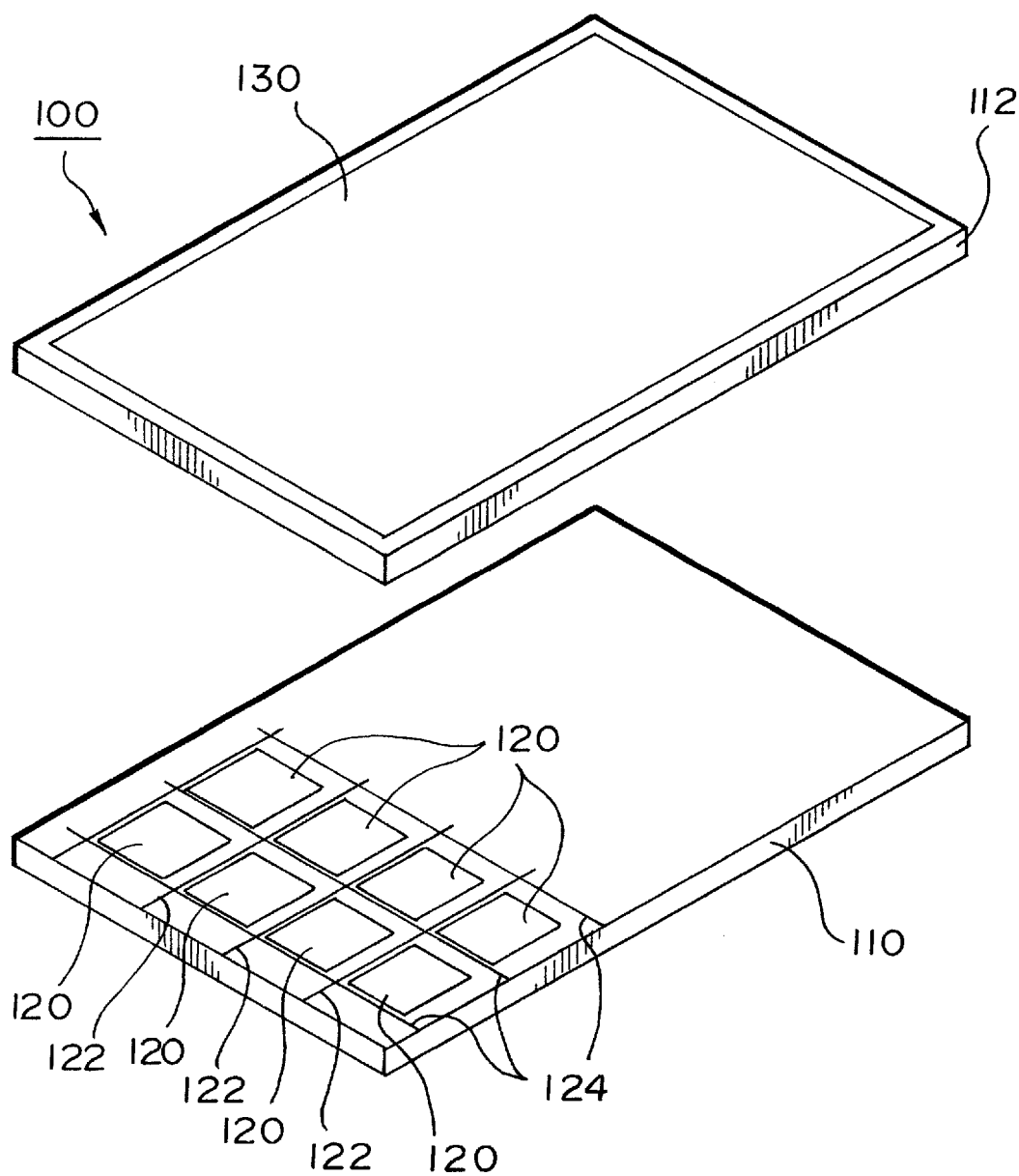
FIG. 1 is a perspective view of a liquid crystal display panel comprising a plurality of pixel electrodes disposed in a rectangular array.

The drawing figures are intended to illustrate the general manner of construction and are not necessarily to scale. FIG. 1 depicts a liquid crystal display panel 100 comprising a lower substrate 110 and an upper substrate 112. A plurality of pixel electrodes 120 are disposed on the upper surface of lower substrate 110, typically in a rectangular array to form the appropriate number of pixels necessary to display a particular video format (e.g. 640×480 pixels for VGA, 800×600 pixels for SVGA, etc.). Each of pixel electrodes 120 is separately addressable by means of a plurality of drain (data) lines 122 and a plurality of gate (latch) lines 124. A single transparent electrode 130 is disposed on the lower side of upper substrate 112. Upper substrate 112 and lower substrate 110 are assembled such that a precisely controlled gap is formed between pixel electrodes 120 and transparent electrode 130. The gap between pixel electrodes 120 and transparent electrode 130 is filled with a liquid crystal material such that a voltage difference between pixel electrodes and transparent electrode 130 causes the polarization of light passing through the liquid crystal material is rotated in proportion to the magnitude of the voltage differential between pixel electrodes 120 and transparent electrode 130. Transparent electrode 130 is maintained at a reference voltage (Vcom) so that the gray scale of each pixel is determined solely by the voltage of each individual pixel electrode 120. As discussed hereinbefore, the resolution of liquid crystal display 100 is determined by the configuration of pixel electrodes 120. Accordingly, liquid crystal display 100 is capable of showing only one video display format absent a video signal processor for resizing, reformatting and frame rate conversion of the incoming video signal.

Figure 2:
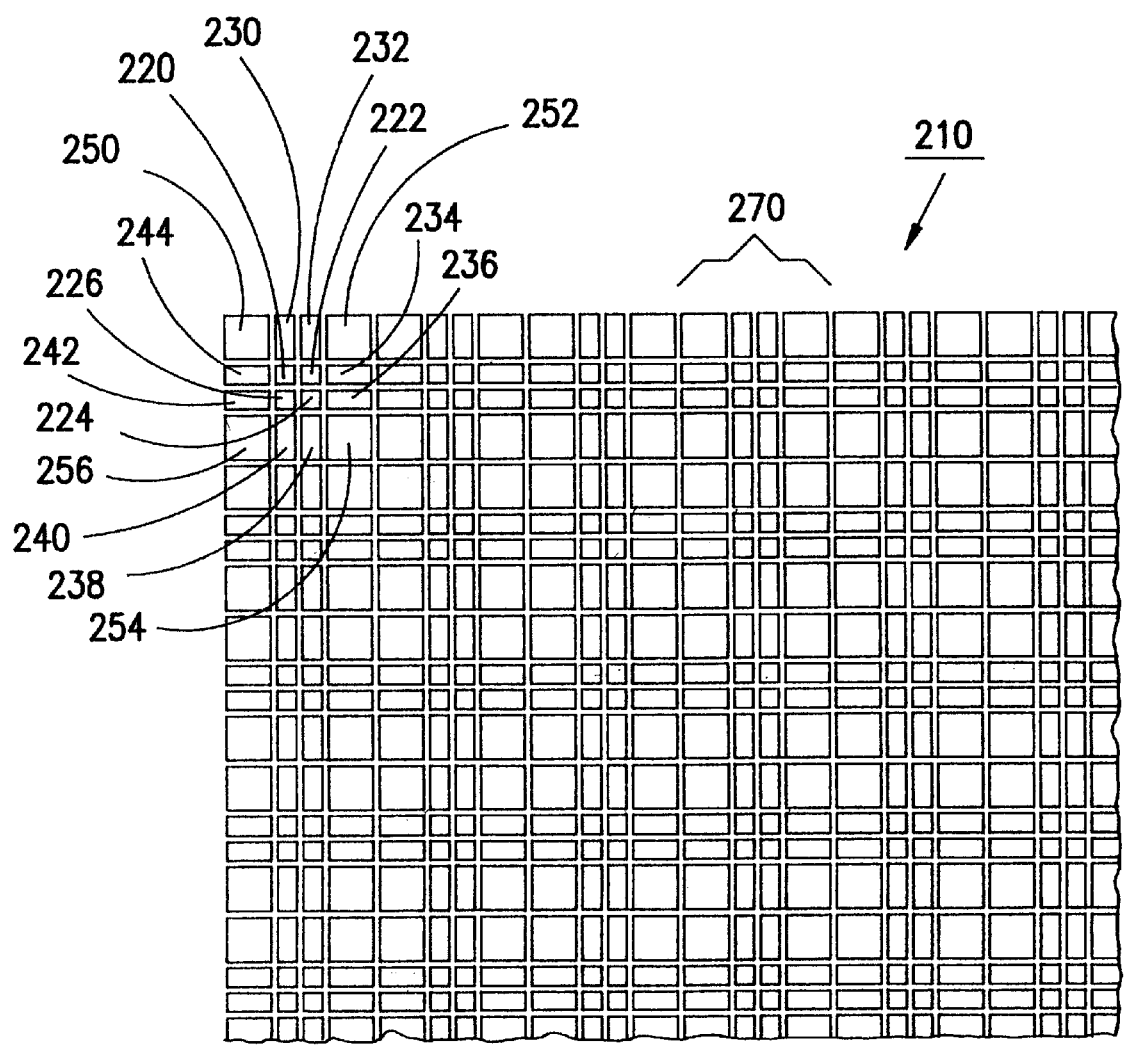
FIG. 2 is a plan view of a portion of a lower substrate of a liquid crystal display in accordance with the teachings of the present invention.

FIG. 2 shows a portion of a lower substrate 210 in accordance with the teachings of the present invention. Lower substrate 210 has disposed on it a plurality of sub-pixel electrodes 220, 222, 224 and 226, each having a square configuration with a side equal to one unit in length. (The actual size of the electrodes will, of course, depend upon the size of the display. Accordingly, dimensionless units will be used herein for the purpose of the illustrative embodiments). Substrate 210 further comprises a plurality of sub-pixel electrodes 230, 232, 234, 236, 238, 240, 242 and 244 having a rectangular configuration with the short side equal to one unit in length and the long side equal to two units in length. The substrate 210 further comprises sub-pixel electrodes 250, 252, 254 and 256 each having a square configuration with a side equal to two units in length. Collectively, sub-pixel electrodes 220, 222, 224, 226, 230, 232, 234, 236, 238, 240, 242, 244, 250, 252, 254 and 256 comprise an array of sub-pixel electrodes forming a macro-pixel 270 that repeats in a rectangular array to form the complete pixel electrode array disposed on substrate 210. As arranged, the sub-pixel electrodes forming macro-pixel 270 can be described in matrix form as follows (dimensions in X, Y coordinates):

| (2 × 2) | (1 × 2)(1 × 2) | (2 × 2) |
| (2 × 1) | (1 × 1)(1 × 1) | (2 × 1) |
| (2 × 1) | (1 × 1)(1 × 1) | (2 × 1) |
| (2 × 2) | (1 × 2)(1 × 2) | (2 × 2) |

Figure 3:
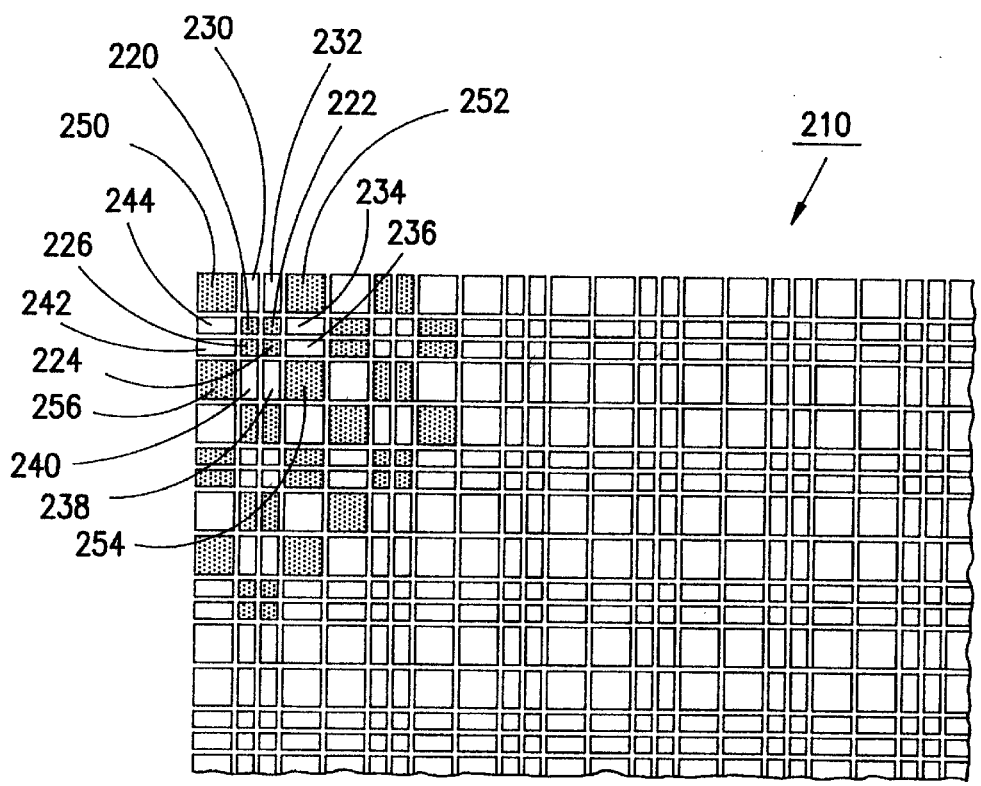
FIG. 3 is a plan view of the lower substrate of FIG. 2 in a high-resolution mode.

As shown in FIG. 3, in a high resolution mode, the sub-pixel electrodes 250, 252, 254 and 256 are separately addressed to form pixels of the displayed image. Sub-pixel electrodes 230 and 232 are addressed as a pair to create a single pixel of the displayed image. Similarly, sub-pixel electrodes 234 and 236; 238 and 240; and sub-pixel electrodes 242 and 244 are addressed as pairs to form pixels of the displayed image. Finally, sub-pixel electrodes 220, 222, 224 and 226 are addressed as a group to form a single pixel of the displayed image.

Figure 4:
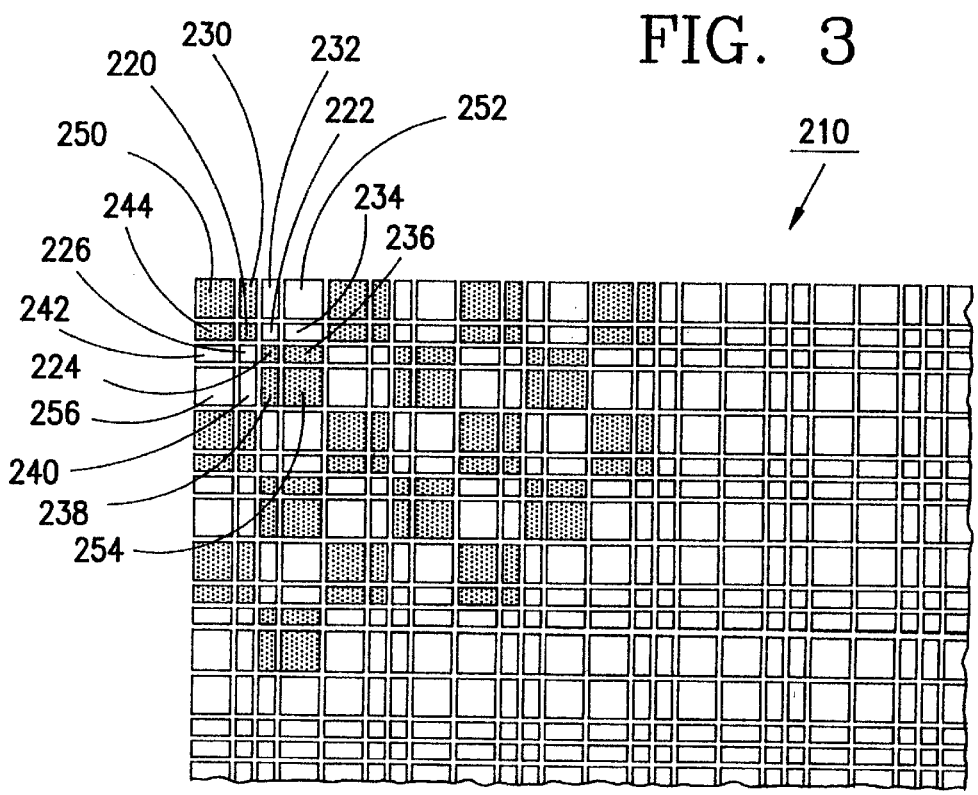
FIG. 4 is a portion of the lower substrate of FIG. 2 in a lower resolution mode.

As shown in FIG. 4, the same substrate 210 is capable of displaying a lower-resolution image, in full-scale by addressing the sub-pixel electrodes in a different manner so as to create pixels appropriate to the video display format. For example, as shown in FIG. 4, in a lower resolution mode, sub-pixel electrodes 250, 220, 230 and 244 are addressed as a group to form a pixel of the displayed image. Similarly sub-pixel electrodes 222, 234, 252 and 232 are addressed as a group to form a pixel of the displayed image, sub-pixel electrodes 236, 254, 238 and 224 are addressed as a group to form a pixel of the displayed image and sub-pixel electrodes 242, 226, 240 and 256 are addressed as a group to form pixel of the displayed image. The sub-pixel electrodes in the remaining macro-pixels 270 are addressed in a similar manner to form the complete image.

Figure 5:
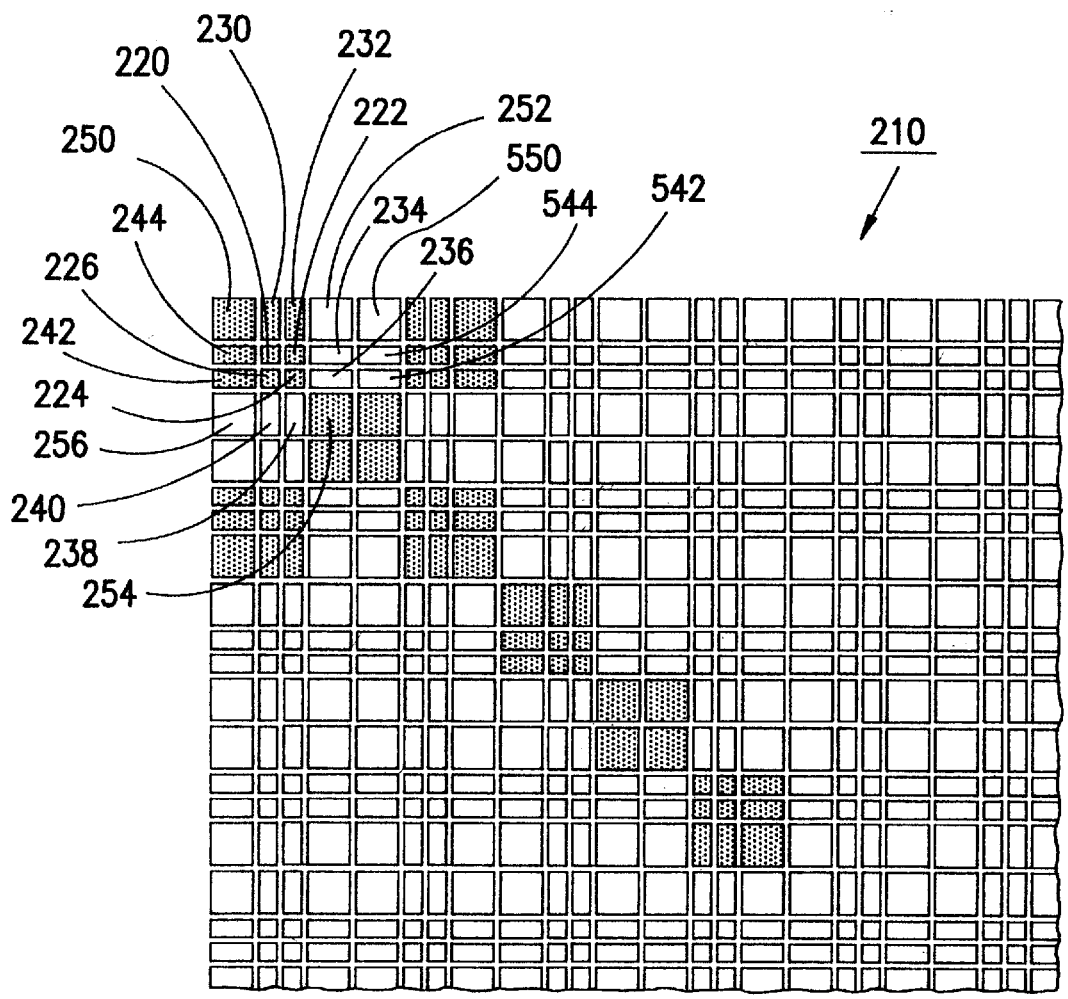
FIG. 5 is a portion of the lower substrate of FIG. 2 in a still lower resolution mode.

As shown in FIG. 5, in a still courser resolution mode, sub-pixel electrodes 250, 230, 232, 222, 224, 226, 242, 244 and 220 are addressed as a group to form a pixel of the displayed image having a square configuration with a side equal to four units in length. Similarly, sub-pixel electrodes 252, 234, 236, 542, 544 and 550 are addressed as a group to form a pixel of the displayed image. The remaining sub-pixel electrodes are addressed together in groups in a similar fashion to form pixels having square configurations each having a side equal to four units in length.

As can be determined from the foregoing, the particular configuration of square pixel electrodes and adjacent rectangular pixel electrodes enable a single display to display images having a one-to-one resolution, one and one-half-to-one resolution and two-to-one resolution without the need to perform any image processing on the incoming graphical image. Thus, for example, a single micro-display having a width of 3,072 units and a height of 2,304 units is capable of displaying an SVGA image (each pixel 4 units on a side, 768×576 pixels); XGA (each pixel on a side, 1,024×768 pixels); and SXGA+ (each pixel 2 units on a side, 1,536× 1,152 pixels) all in their native format without the need for any preprocessing of the incoming image signal.

Figure 6:
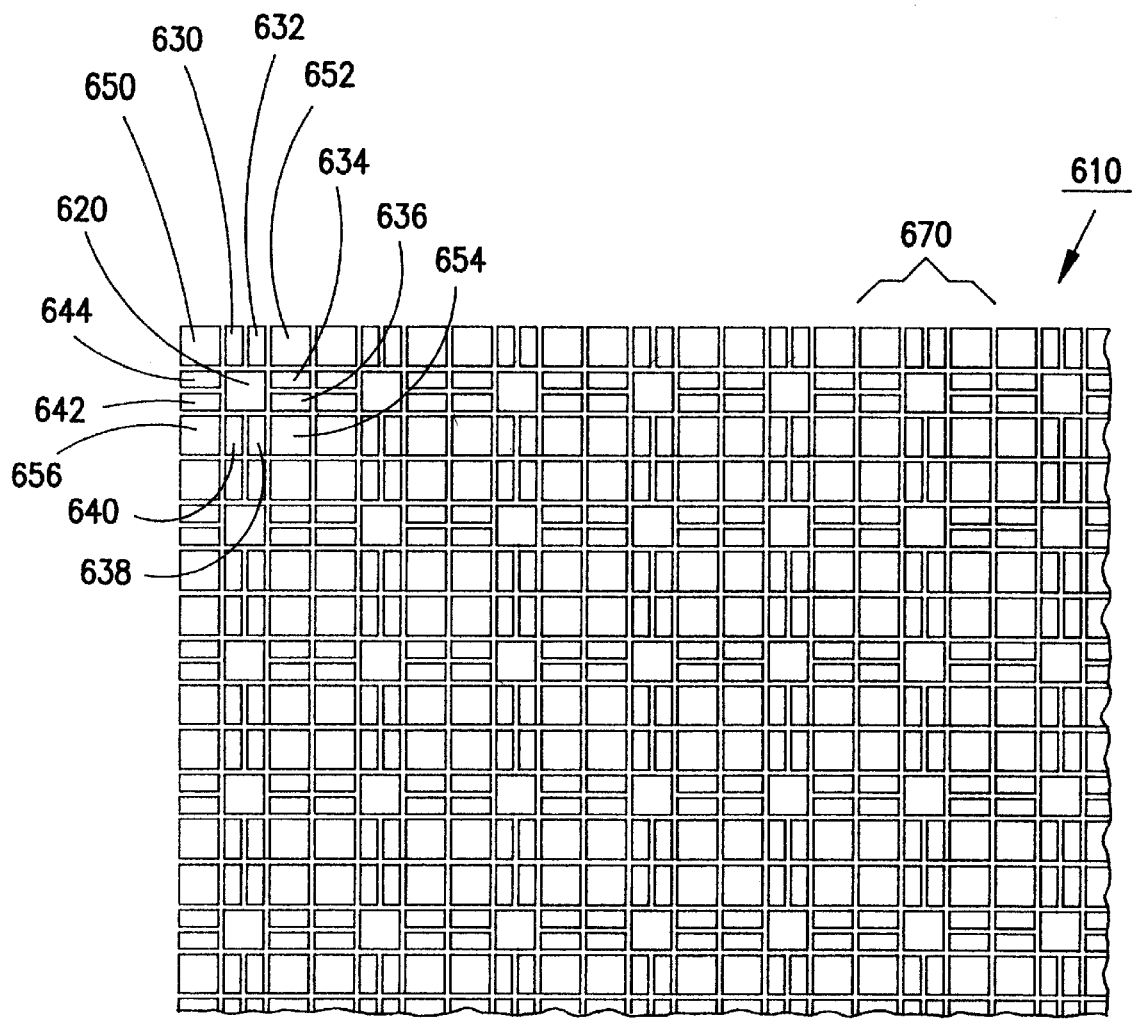
FIG. 6 is an alternative embodiment of a lower substrate of a liquid crystal display in accordance with the teachings of the present invention.

FIG. 6 depicts an alternative embodiment of a reconfigurable liquid crystal display. The embodiment of FIG. 6 comprises a lower substrate 610 on which is disposed a plurality of sub-pixel electrodes 650, 652, 654 and 656 of square configuration having a side equal to two units in length. Substrate 610 further comprises a plurality of sub-pixel electrodes 630, 632, 634, 636, 638, 640, 642 and 644 of rectangular configuration having a long side equal to two units in length and a short side equal to one unit in length. Substrate 610 further comprises a sub-pixel electrode 620 also of square configuration with a side equal to two units in length. Collectively, the foregoing sub-pixel electrodes 620, 630, 632, 634, 636, 638, 640, 642, 644, 650, 652, 654 and 656 comprise a macro-pixel electrode 670 which is repeated across the surface of substrate 610 to form the complete electrode array. As can be determined from an inspection from FIG. 2 and FIG. 6, in the embodiment of FIG. 6, the four square sub-pixel electrodes 220, 222, 224 and 226 each having a side of one unit of length are replaced by a single square electrode 620 having a side of two units in length. The advantage of the configuration of FIG. 6 is that it reduces the number of electrode interconnections by over 18%. The absence of the individually addressable one unit length square electrodes has no effect on the resolution in either the highest or lowest resolution modes since, as shown in FIGS. 3 and 5, the unit-length sub-pixel electrodes of the embodiment of FIG. 2 are driven collectively as a group in these modes. It is only in the middle resolution mode as shown in FIG. 4 that the individually addressable unit length square sub-pixel electrodes are individually addressed. Accordingly, the embodiment of FIG. 6 is capable of displaying the highest resolution (two unit-length pixels) and lowest resolution (four unit-length pixels) with 18% fewer electrode interconnections and no degradation in performance.

Figure 7:
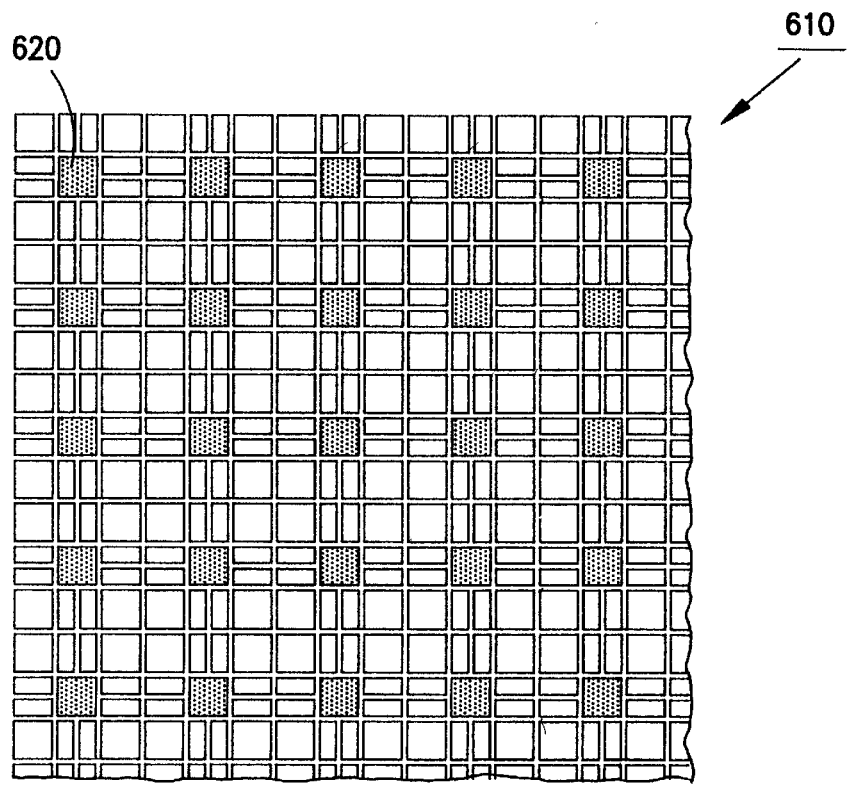
FIG. 7 is a plan view of a portion of the lower substrate of FIG. 6 with certain pixels selected dark.
Figure 8:
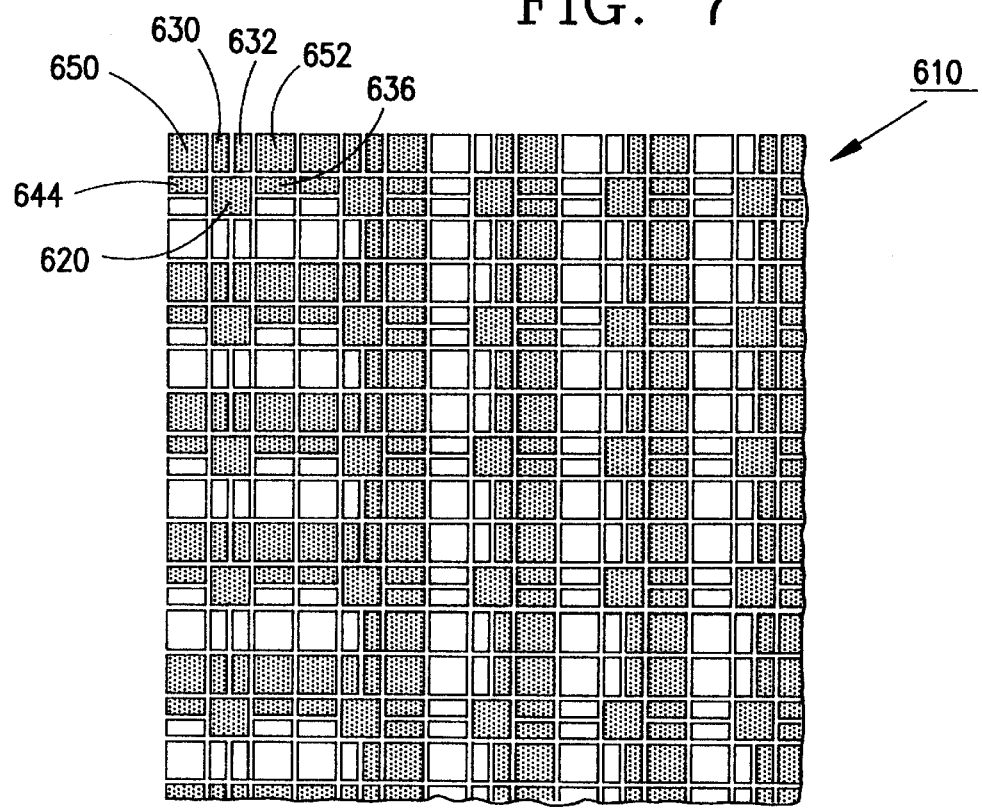
FIG. 8 is a plan view of a portion of the lower substrate of FIG. 6 with additional pixels selected dark.

As shown in FIG. 7, in the intermediate resolution mode (three unit-length pixels) all of sub-pixel electrodes 620 are driven to the dark state. As is well known in the art, the human eye will tolerate a substantial percentage of a display being darkened in this manner without any perceptible decrease in resolution. Driving the pixels to the dark state rather than leaving them in the light state avoids unnecessary degradation of the contrast of the display. As shown in FIG. 8, with sub-pixel electrodes 620 driven to the dark state, the remaining sub-pixel electrodes forming each macro-pixel 670 are driven in combination to provide the appropriate pixel size of three units in length. For example, sub-pixel electrodes 650, 630 and 644 are addressed as a group to create a substantially square pixel having a side of three units in length. (The pixel is said to be substantially square because the area occupied the corner of sub-pixel electrode 620 is not part of the aforementioned substantially square pixel). Similarly, sub-pixel electrodes 632, 652 and 634 are addressed as a group to create a substantially square pixel having a side of three units in length.

Figure 9:
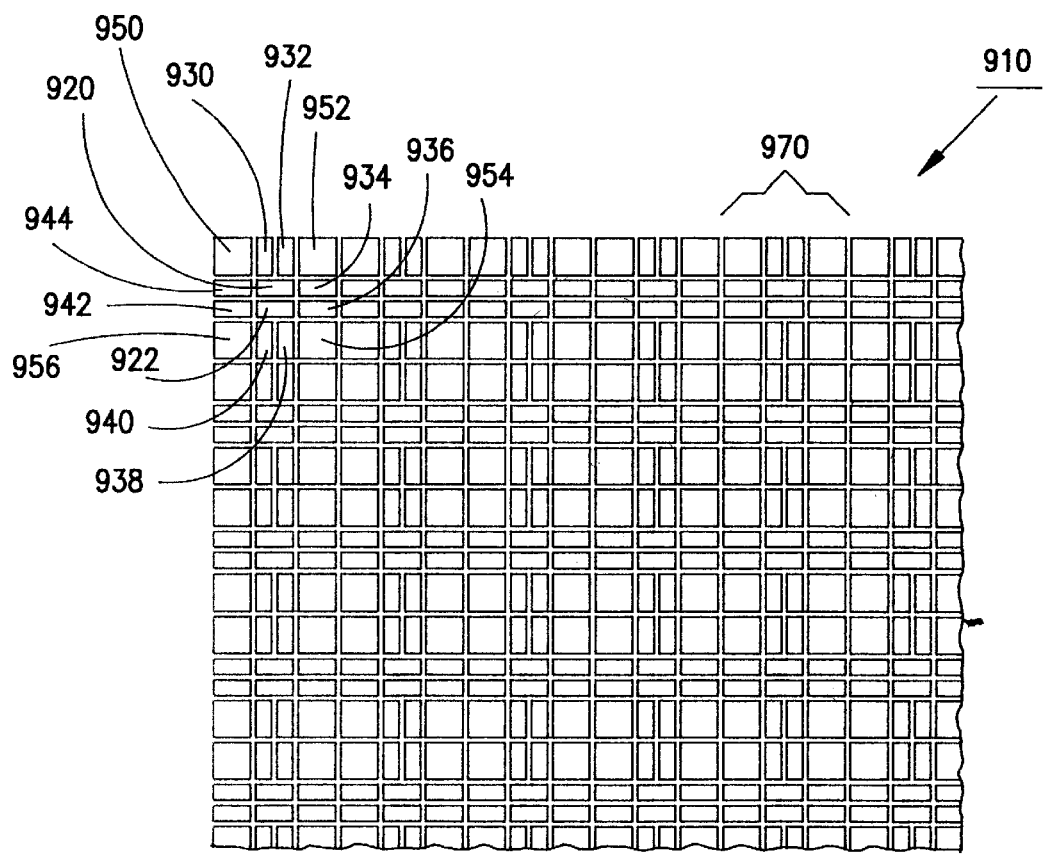
FIG. 9 is a further alternative embodiment of the lower substrate of FIG. 2.

FIG. 9 depicts yet another embodiment of a reconfigurable liquid crystal display in accordance with the present invention. In the embodiment of FIG. 9, lower substrate 910 comprises a plurality of sub-pixel electrodes 950, 952, 954 and 956 having a square configuration with a side equal to two units in length. The substrate 910 further comprises a plurality of sub-pixel electrodes 930, 932, 934, 936, 938, 940, 942 and 944 having a rectangular configuration with the long side equal to two units in length and the short side equal to one unit in length. The substrate 910 further comprises sub-pixel electrodes 920 and 922. Also a rectangular configuration having a long side equal to two units in length and a short side equal to one unit in length. Collectively, sub-pixel electrodes 950, 952, 954, 956, 930, 932, 934, 936, 938, 940, 942, 944, 920 and 922 comprise a macro-pixel 970 that is repeated across the surface of substrate 910 to form the complete electrode array for the display. As with the embodiment of FIG. 2, in the highest resolution mode, sub-pixel electrodes 930 and 932; 934 and 936; 938 and 940; and 942 and 944 are addressed as groups to create two unit length square pixels. Additionally, pixels 920 and 922 are addressed as a group to create a two-unit length square pixel. In the low resolution mode sub-pixel electrodes 950, 930, 932, 920, 922, 942 and 944 are addressed as a group to create a four unit length square pixel. The remaining sub-pixel electrodes are addressed in similar groups to create additional four-unit length pixels to display the image in the appropriate format.

Figure 10:
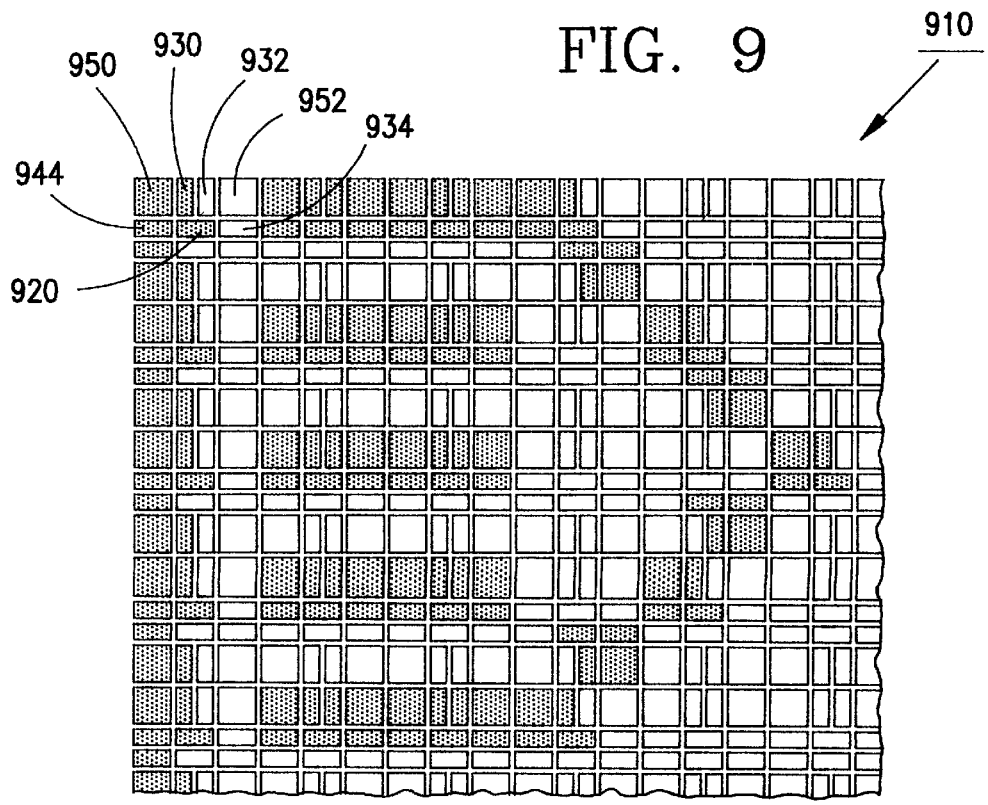
FIG. 10 is a plan view of the lower substrate of FIG. 9 with certain pixels selected dark.

As shown in FIG. 10, in the intermediate resolution mode, sub-pixel electrodes 950, 930, 920 and 944 are addressed as a group to create a substantially square pixel having a three unit-length side (the pixel is substantially square because a portion of sub-pixel electrode 920 extends beyond a three unit-length square). Similarly, sub-pixel electrodes 932, 952 and 934 are addressed as a group to create a three unit-length substantially square pixel. (In this case the pixel is substantially square because a portion of the pixel corresponding to sub-pixel electrode 920 is missing.) As can be determined from an inspection of FIG. 10, in the intermediate resolution mode, the fidelity and contrast is increased over the embodiment of FIG. 6 while still maintaining a decrease of over 12% in the number of electrode interconnections over the embodiment of FIG. 2.

Figure 11:
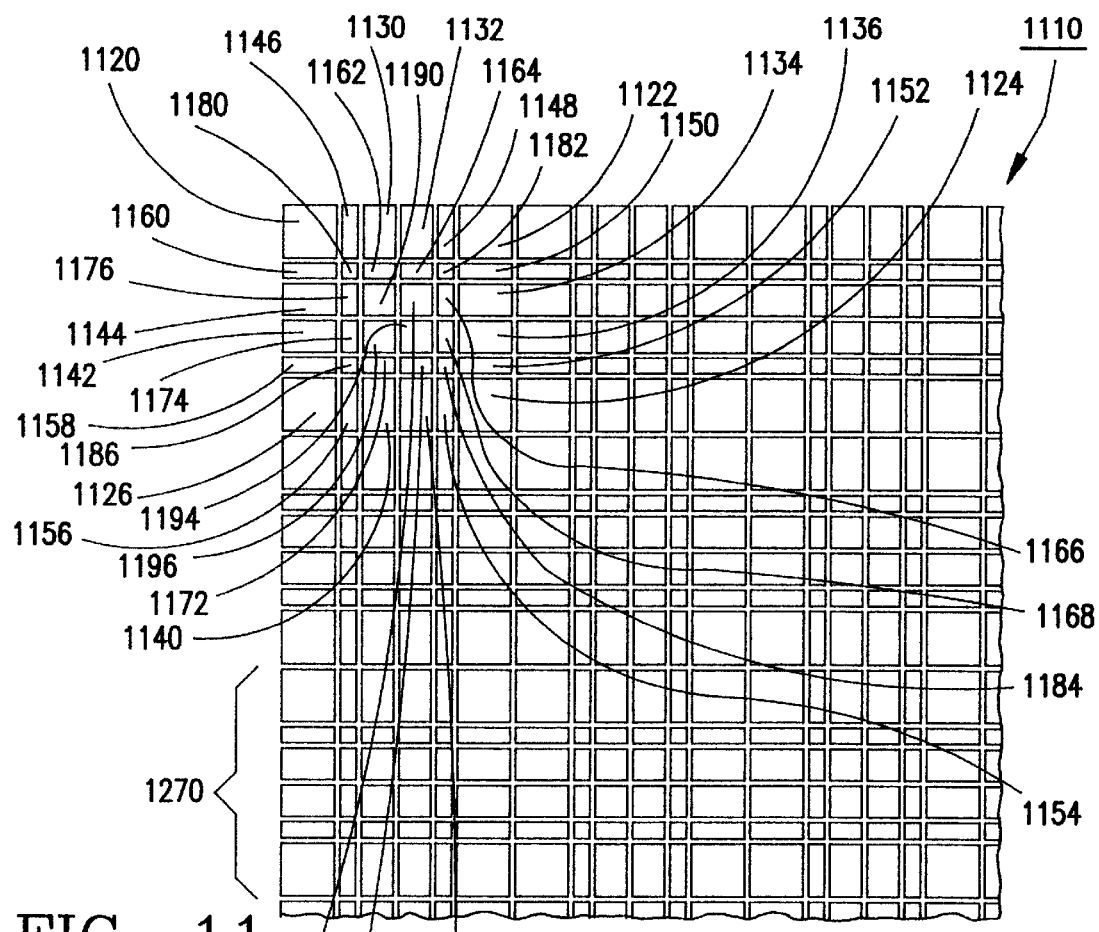
FIG. 11 is a plan view of a substrate comprising a further alternative embodiment of a reconfigurable microdisplay in accordance with the present invention.

FIG. 11 depicts yet another embodiment of a reconfigurable liquid crystal display capable of displaying graphical information in three, four, six, eight and larger unit-length pixels. The embodiment of FIG. 11 is capable of 4:3, 2:1, 8:3 and greater resolution ratios. A single display having a width of 4100 units and a height of 3100 units is capable of displaying a VGA image (each pixel 6 units on a side 682×512 pixels); an XGA image (each pixel 4 units on a side, 1024×768 pixels); and an SXGA+ image (each pixel 3 units on a side, 1365×1024 pixels). The embodiment of FIG. 11 comprises a substrate 1110 on which is disposed a plurality of sub-pixel electrodes 1120, 1122, 1124 and 1126 having a square configuration with a side equal to three units in length. Substrate 1110 further comprises a plurality of rectangular sub-pixel electrodes 1146, 1148, 1150, 1152, 1154, 1156, 1158 and 1160 having a short side equal to one unit in length and a long side equal to three units in length. Substrate 1110 further comprises a plurality of rectangular sub-pixel electrodes 1130, 1132, 1134, 1136, 1138, 1140, 1142 and 1144 having a short side equal to two units in length and a long side equal to three units in length. Substrate 1110 further comprises a plurality of rectangular electrodes 1162, 1164, 1166, 1168, 1170, 1172, 1174 and 1176 having a short side equal to one unit in length and a long side equal to two units in length. Substrate 1110 further comprises square electrodes 1180, 1182, 1184 and 1186 each having a side equal to one unit in length. Finally substrate 1110 further comprises square electrodes 1190, 1192, 1194 and 1196 each having a side equal to two units in length. As arranged, the sub-pixel electrodes forming macro-pixel 1 270 can be described in matrix form as follows (dimensions in X, Y coordinates):

| (3 × 3) | (1 × 3)(2 × 3) | (2 × 3)(1 × 3) | (3 × 3) |
|---------|----------------|----------------|---------|
| (3 × 1) | (1 × 1)(2 × 1) | (2 × 1)(1 × 1) | (3 × 1) |
| (3 × 2) | (1 × 2)(2 × 2) | (2 × 2)(1 × 2) | (3 × 2) |
| (3 × 2) | (1 × 2)(2 × 2) | (2 × 2)(1 × 2) | (3 × 2) |
| (3 × 1) | (1 × 1)(2 × 1) | (2 × 1)(1 × 1) | (3 × 1) |
| (3 × 3) | (1 × 3)(2 × 3) | (2 × 3)(1 × 3) | (3 × 3) |

Figure 12:
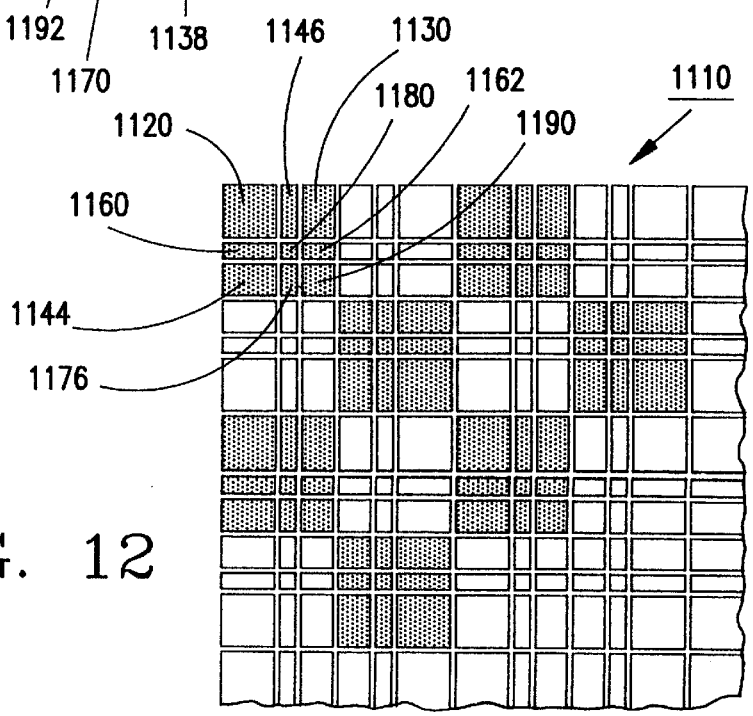
FIG. 12 is a plan view of a portion of the lower substrate of FIG. 11 in a low resolution mode.

As shown in FIG. 12, in a course display mode, sub-pixel electrodes 1120, 1146, 1130, 1180, 1162, 1190, 1176, 1144 and 1160 are addressed collectively to form a square pixel having a side equal to six units in length. The remaining sub-electrodes of substrate 1110 are addressed in a similar manner to create the displayed image.

Figure 13:
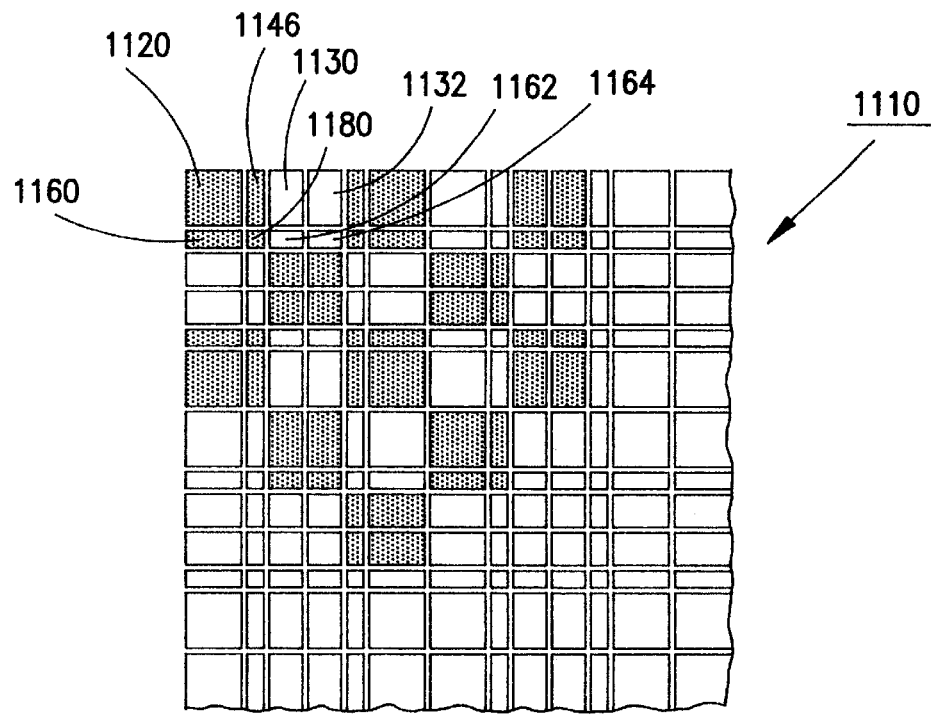
FIG. 13 is a plan view of a portion of the lower substrate of FIG. 11 in an intermediate resolution mode.
Figure 14:
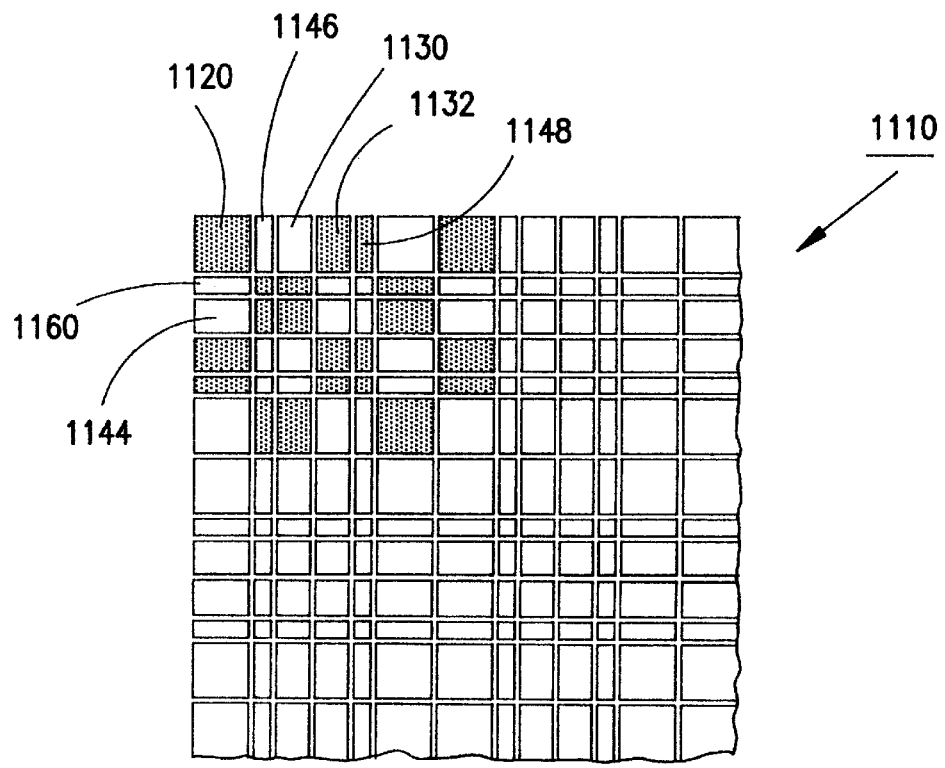
FIG. 14 is a plan view of a portion of the lower substrate of FIG. 11 in a fine resolution mode.

As shown in FIG. 13, in a finer resolution display mode, sub-pixel electrodes 1120, 1146, 1180 and 1160 are addressed collectively to form a four unit-length square pixel. Similarly, sub-pixel electrodes 1130, 1132, 1162 and 1164 are addressed collectively to create a four unit-length square pixel. The remaining sub-pixel electrodes are addressed in a similar fashion to create four unit-length square pixels for displaying the image. Finally, as shown in FIG. 14, in a still finer resolution mode, sub-pixel electrode 1120 is addressed individually to create a three unit-length pixel. Sub-pixel electrodes 1146 and 1130 are addressed collectively to form a three-unit length square pixel. Similarly, sub-pixel electrodes 1132 and 1148; 1160 and 1144 are addressed collectively to create additional three-unit length square pixels. The remaining sub-pixel electrodes are addressed in similar fashion to create three unit-length pixels for displaying the image.

As can be seen from the foregoing, the unique layout of rectangular sub-pixel electrodes adjacent square sub-pixel electrodes permits the electrodes to be combined to increase or decrease resolution of the display as required to display a graphical image in its native display format.

Although certain illustrative embodiments and methods have been disclosed herein, it will be apparent from the foregoing disclosure to those skilled in the art that variations and modifications of such embodiments and methods may be made without departing from the spirit and scope of the invention. For example, although the illustrative embodiments contemplate a liquid crystal display the teachings of the present invention are equally applicable to gas plasma displays or other displays in which the picture elements are fixed in space and addressed individually. Accordingly, it is intended that the invention shall be limited only to the extent required by the appended claims and the rules and principles of applicable law.

What is claimed is:

1. A display device comprising:
   a first substrate, said first substrate comprising a transparent plate having disposed thereon a transparent electrode;
   a second substrate spaced apart from said first substrate, said first and second substrates cooperating to form a gap therebetween, said second substrate having disposed thereon an array of pixel electrodes; and
   a liquid crystal material disposed in said gap, said liquid crystal material being capable of responding to an electric field between a selected one of said array of pixel electrodes and said at least one transparent electrode to alter a polarization state of light passing through said liquid crystal material,
   said array of pixel electrodes comprising a plurality of square electrodes and a plurality of rectangular electrodes with each of said plurality of square electrodes disposed adjacent at least one rectangular electrode, said plurality of square electrodes and said plurality of rectangular electrodes selectable in a first combination to generate a first array of contiguous, substantially square pixels each pixel of which is a first size and selectable in a second combination to generate a second array of contiguous square pixels each pixel of which is a second size.

2. The display device of claim 1, wherein:
   said plurality of square pixels comprises pixels having a side of 2 units in length and each of said plurality of rectangular pixels has a side of 2 units in length and a side of 1 unit in length.

3. The display device of claim 2, wherein:
   said plurality of square pixels further comprises pixels each having a side of 1 unit in length.

4. The display device of claim 1, wherein:
   said plurality of square pixels comprises pixels each having a side of 3 units in length and said plurality of rectangular pixels comprises pixels having a side of 3 units in length and a side of 2 units in length.

5. The display device of claim 4, wherein:
   said plurality of rectangular pixels further comprises pixels having a side of 3 units in length and a side of 1 unit in length.

6. The display device of claim 5, wherein:
   said plurality of square pixels further comprises pixels each having a side of 1 unit in length.

7. A display device comprising:
   a first substrate, said first substrate comprising a transparent plate having disposed thereon at least one transparent electrode;
   a second substrate spaced apart from said first substrate, said first and second substrates cooperating to form a gap therebetween, said second substrate having disposed thereon an array of pixel electrodes; and
   a liquid crystal material disposed in said gap, said array of pixel electrodes comprising a plurality of square electrodes and a plurality of rectangular electrodes arranged in a repeating 3×3 array of pixels composed of sub-pixels having dimensions (X, Y) as follows:

| | | |
|---|---|---|
| (2 × 2) | (1 × 2)(1 × 2) | (2 × 2) |
| (2 × 1) | (1 × 1)(1 × 1) | (2 × 1) |
| (2 × 1) | (1 × 1)(1 × 1) | (2 × 1) |
| (2 × 2) | (1 × 2)(1 × 2) | (2 × 2) |

8. A display device comprising:
   a first substrate, said first substrate comprising a transparent plate having disposed thereon at least one transparent electrode;
   a second substrate spaced apart from said first substrate, said first and second substrates cooperating to form a gap therebetween, said second substrate having disposed thereon an array of pixel electrodes; and
   a liquid crystal material disposed in said gap,
   said array of pixel electrodes comprising a plurality of square electrodes and a plurality of rectangular electrodes arranged in a repeating 3×3 array of pixels composed of sub-pixels having dimensions (X, Y) as follows:

| | | |
|---|---|---|
| (2 × 2) | (1 × 2)(1 × 2) | (2 × 2) |
| (2 × 1) | (2 × 2) | (2 × 1) |
| (2 × 1) | | (2 × 1) |
| (2 × 2) | (1 × 2)(1 × 2) | (2 × 2) |

9. A display device comprising:
   a first substrate, said first substrate comprising a transparent plate having disposed thereon at least one transparent electrode;
   a second substrate spaced apart from said first substrate, said first and second substrates cooperating to form a gap therebetween, said second substrate having disposed thereon an array of pixel electrodes; and a liquid crystal material disposed in said gap,
said array of pixel electrodes comprising a plurality of square electrodes and a plurality of rectangular electrodes arranged in a repeating 3×3 array of pixels composed of sub-pixels having dimensions (X, Y) as follows:

| | | |
|---|---|---|
| (2 × 2) | (1 × 2)(1 × 2) | (2 × 2) |
| (2 × 1) | (1 × 2)(1 × 2) | (2 × 1) |
| (2 × 1) | | (2 × 1) |
| (2 × 2) | (1 × 2)(1 × 2) | (2 × 2) |

10. A display device comprising:
a first substrate, said first substrate comprising a transparent plate having disposed thereon at least one transparent electrode;
a second substrate spaced apart from said first substrate, said first and second substrates cooperating to form a gap therebetween, said second substrate having disposed thereon an array of pixel electrodes; and
a liquid crystal material disposed in said gap.

said array of pixel electrodes comprising a plurality of square electrodes and a plurality of rectangular electrodes arranged in a repeating 4×4 array of pixels composed of sub-pixels having dimensions (X, Y) as follows:

| | | | |
|---|---|---|---|
| (3 × 3) | (1 × 3)(2 × 3) | (2 × 3)(1 × 3) | (3 × 3) |
| (3 × 1) | (1 × 1)(2 × 1) | (2 × 1)(1 × 1) | (3 × 1) |
| (3 × 2) | (1 × 2)(2 × 2) | (2 × 2)(1 × 2) | (3 × 2) |
| (3 × 2) | (1 × 2)(2 × 2) | (2 × 2)(1 × 2) | (3 × 2) |
| (3 × 1) | (1 × 1)(2 × 1) | (2 × 1)(1 × 1) | (3 × 1) |
| (3 × 3) | (1 × 3)(2 × 3) | (2 × 3)(1 × 3) | (3 × 3) |

* * * * *